United States Patent
Mishaeli et al.

(10) Patent No.: US 10,216,662 B2
(45) Date of Patent: Feb. 26, 2019

(54) HARDWARE MECHANISM FOR PERFORMING ATOMIC ACTIONS ON REMOTE PROCESSORS

(71) Applicant: Intel Corporation, Santa Clara, CA (US)

(72) Inventors: Michael Mishaeli, Zichron Yaakov (IL); Ido Ouziel, Ein Carmel (IL); Baruch Chaikin, D.N. Misagv (IL); Yoav Zach, Karkur (IL)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/866,933

(22) Filed: Sep. 26, 2015

(65) Prior Publication Data
US 2017/0091128 A1    Mar. 30, 2017

(51) Int. Cl.
G06F 13/24      (2006.01)
G06F 12/1027    (2016.01)
G06F 12/0891    (2016.01)

(52) U.S. Cl.
CPC .......... *G06F 13/24* (2013.01); *G06F 12/1027* (2013.01); *G06F 12/0891* (2013.01); *G06F 2212/1016* (2013.01); *G06F 2212/683* (2013.01)

(58) Field of Classification Search
CPC .................................................. G06F 9/30047
See application file for complete search history.

(56) References Cited

U.S. PATENT DOCUMENTS

| | | | |
|---|---|---|---|
| 4,231,086 A | 10/1980 | Tarbox et al. | |
| 5,765,195 A * | 6/1998 | McDonald | G06F 13/24 711/141 |
| 6,336,179 B1 * | 1/2002 | Gulick | G06F 13/28 709/232 |
| 7,178,062 B1 | 2/2007 | Dice | |
| 8,543,772 B2 * | 9/2013 | Cota-Robles | G06F 12/1036 711/133 |
| 2002/0120800 A1 * | 8/2002 | Sugahara | G06F 13/24 710/260 |
| 2011/0047310 A1 | 2/2011 | Bonola | |
| 2015/0149815 A1 | 5/2015 | Maity et al. | |

OTHER PUBLICATIONS

PCT/US2015/056535 Notification of Transmittal of the Written Opinion of the International Searching Authority, dated Jul. 26, 2016, 11 pages.
PCT/US2015/056535 Notification Concerning Transmittal of International Preliminary Report on Patentability, dated Jul. 26, 2016, 3 pages.
International Preliminary Report on Patentability for Application No. PCT/US2015/056535, dated Apr. 5, 2018, 13 pages.

* cited by examiner

*Primary Examiner* — Henry Tsai
*Assistant Examiner* — Juanito Borromeo
(74) *Attorney, Agent, or Firm* — Nicholson De Vos Webster & Elliott LLP

(57) ABSTRACT

Embodiments of systems, apparatuses, and methods for remote action handling are describe. In an embodiment, a hardware apparatus comprises: a first register to store a memory address of a payload corresponding to an action to be performed associated with a remote action request (RAR) interrupt, a second register to store a memory address of an action list accessible by a plurality of processors, and a remote action handler circuit to identify a received RAR interrupt, perform an action of the received RAR interrupt, and signal acknowledgment to an initiating processor upon completion of the action.

10 Claims, 17 Drawing Sheets

| VALID 201 | PAYLOAD 203 |
|---|---|
| 1 | INVALIDATE PAGE REQUEST, ADDRESS |
| 0 | |
| 0 | |
| ⋮ | ⋮ |

FIG. 2

| | ACTION 0 | ACTION 1 | ACTION 2 | ACTION N |
|---|---|---|---|---|
| RLP 0 | STATUS OF ACTION 303 | | STATUS OF ACTION | |
| RLP 1 | | | | |
| RLP 2 | | | | |

FIG. 9
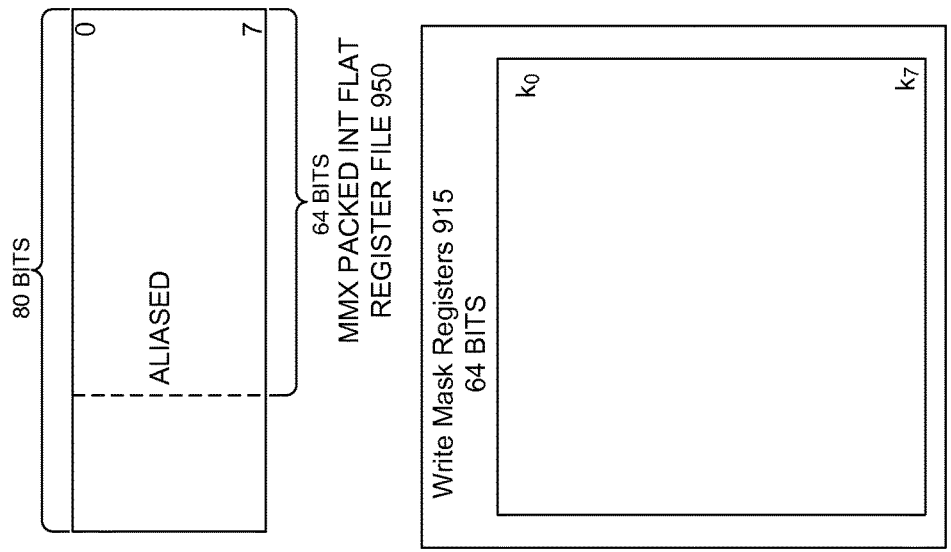
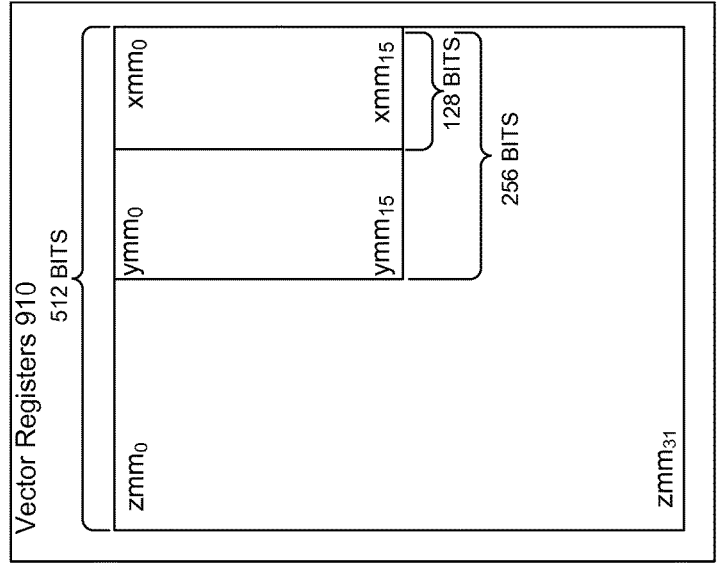

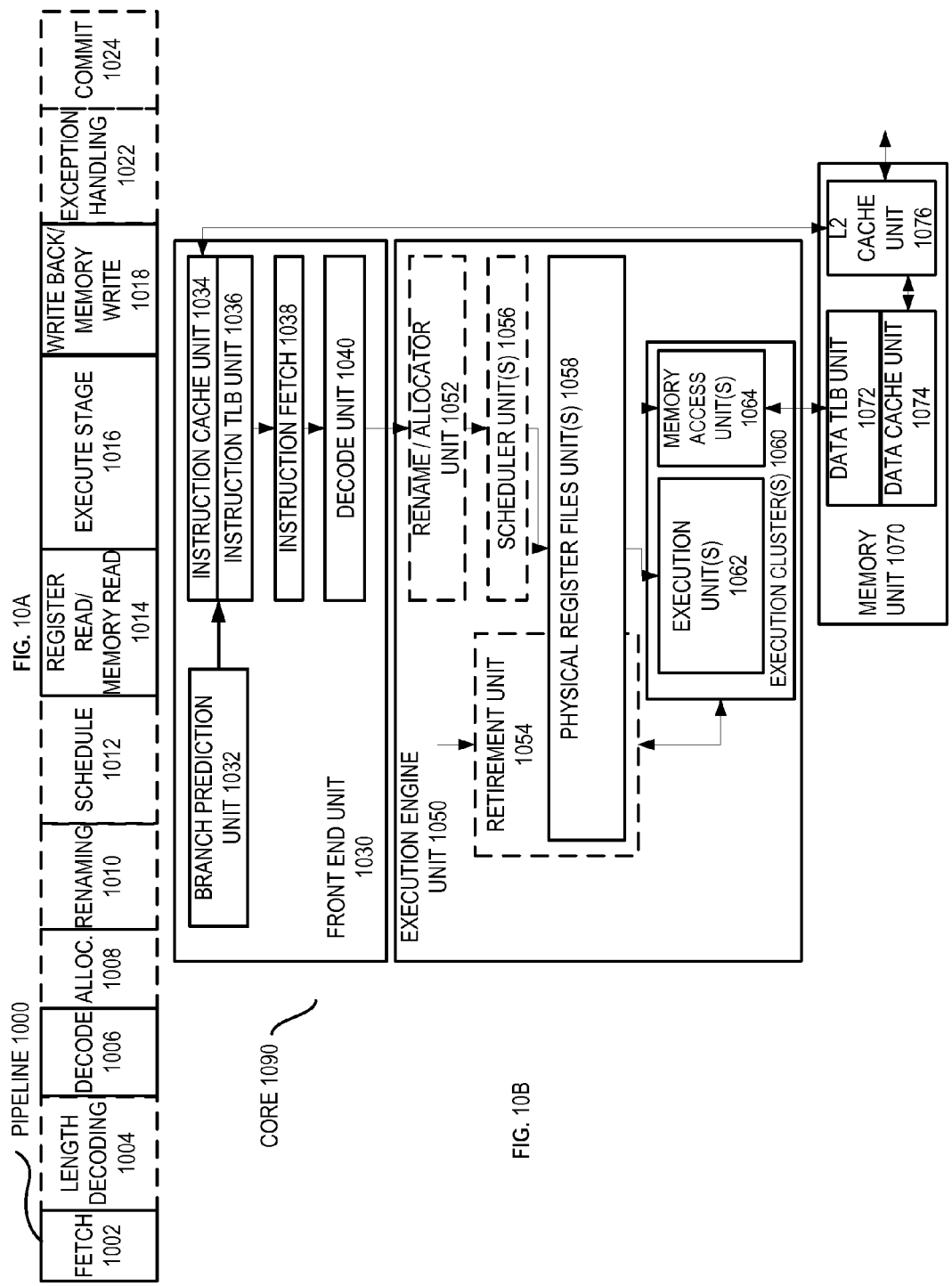

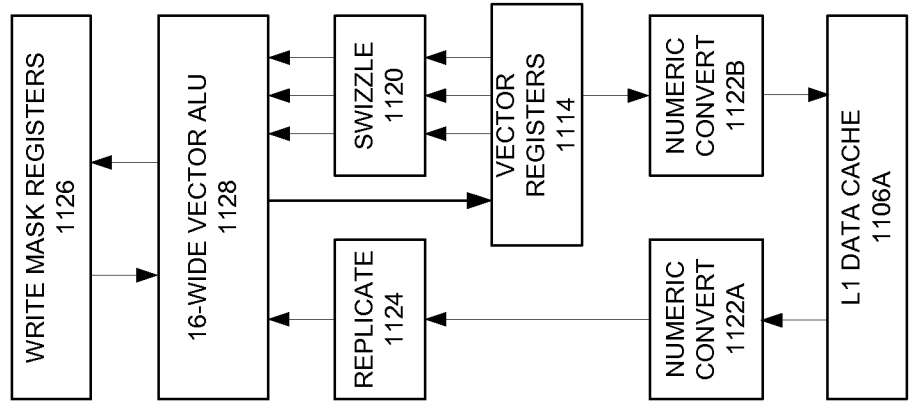
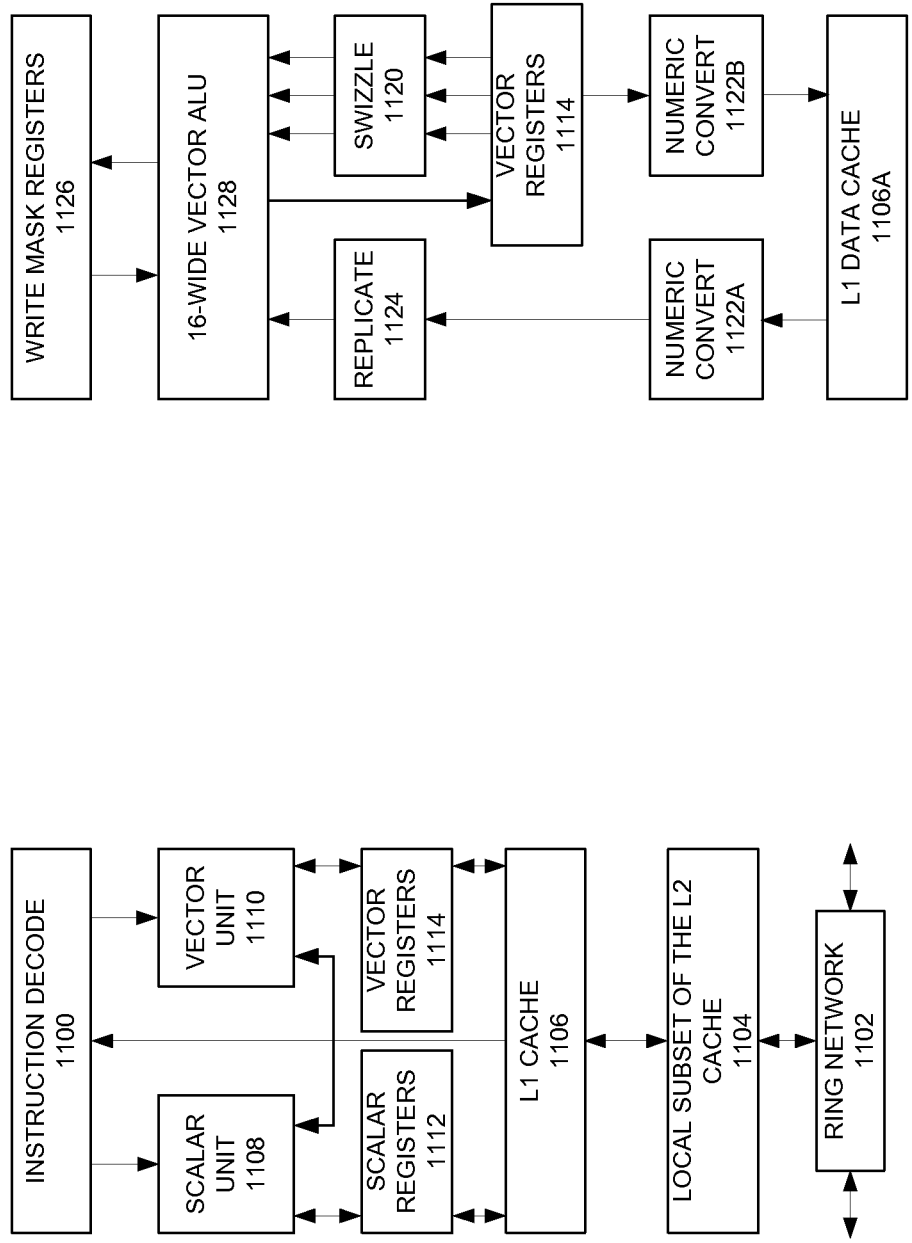

HARDWARE MECHANISM FOR PERFORMING ATOMIC ACTIONS ON REMOTE PROCESSORS

FIELD OF THE INVENTION

Embodiments of the invention relate to the field of computer architecture, and more specifically, to remote action handling.

BACKGROUND

Many multi-processor systems provide for a type of interrupt called an inter-processor interrupt (IPI). An IPI is typically a request for action from a sending processor to a receiving processor. In some systems, the sending processor writes to an interrupt command register or a software interrupt register to initiate the IPI between the sending processor and the receiving processor.

BRIEF DESCRIPTION OF THE DRAWINGS

The present invention is illustrated by way of example and not limitation in the figures of the accompanying drawings, in which like references indicate similar elements, and in which:

FIG. 2 illustrates an embodiment of a payload data structure.

FIG. 3 illustrates an embodiment of an actions data structure.

FIG. 9 is a block diagram of a register architecture according to one embodiment of the invention.

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIGS. 11A-B illustrate a block diagram of a more specific exemplary in-order core architecture, which core would be one of several logic blocks (including other cores of the same type and/or different types) in a chip.

DETAILED DESCRIPTION

Figure 1:
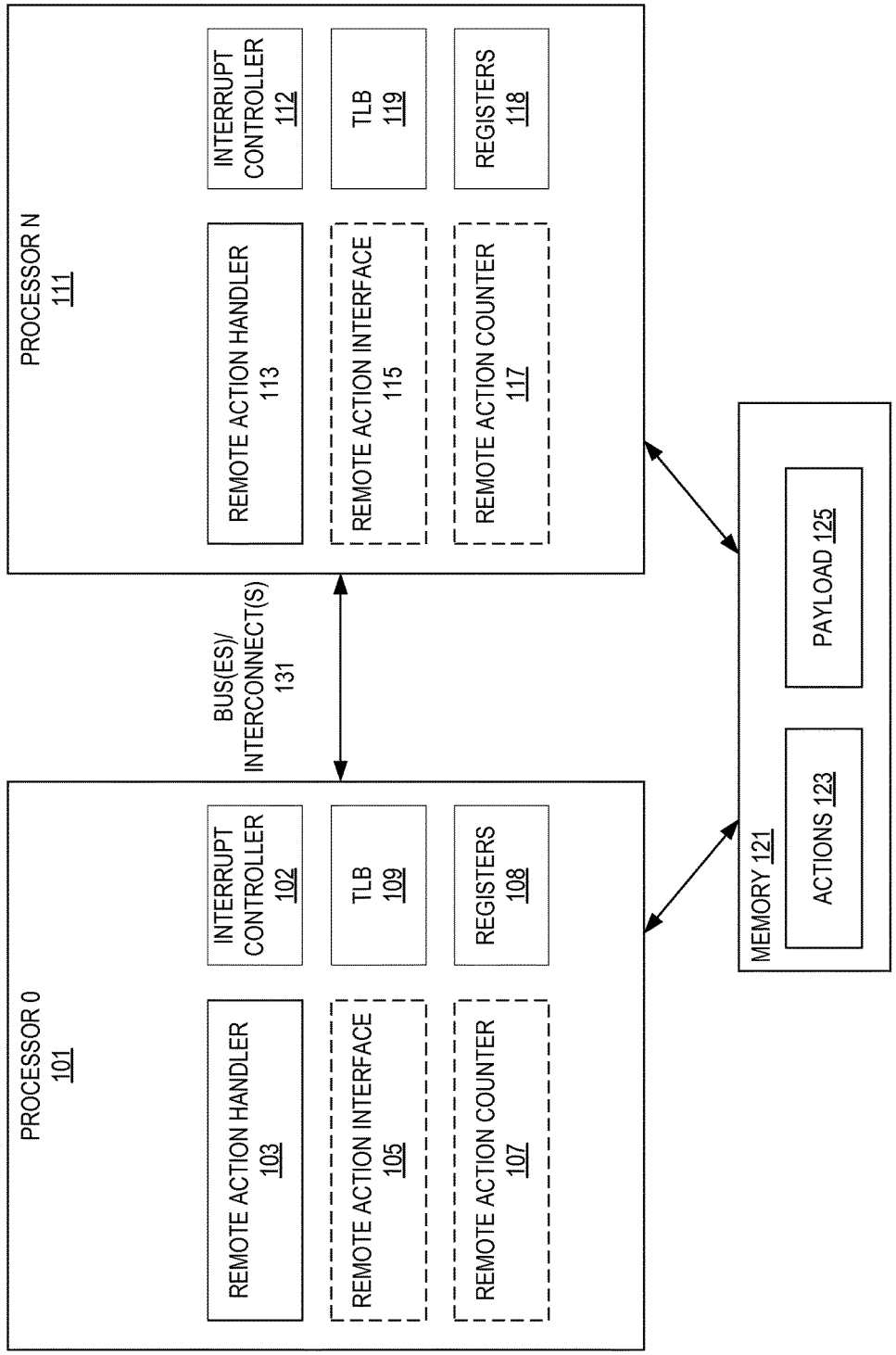
FIG. 1 illustrates an embodiment of a computer system.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed below are embodiments of systems, methods, and apparatuses for remote action handling. The ILP sets up a payload in memory according to a consistent format and then issues a request to the relevant RLPs either by sending an IPI vector (called a Remote Action Request Interrupt (RARI) in this discussion) to the RLPs through an interrupt command register (ICR) or software interrupt register type mechanism of an interrupt controller or by a dedicated signaling mechanism.

When an ILP needs RLPs to perform a specific action, for example to flush a TLB entry, in some embodiments, it initiates the action by sending an inter-processor interrupt (IPI) to each RLP. In some systems, the RLP performs several steps upon receipt of a remote action request. For example, when the RLP is running a user level or ring-3 application, the RLP: 1) performs interrupt-descriptor-table vectoring to jump to the correct interrupt handler software; 2) transitions from user-level to OS-level; 3) performs the requested action in software, i.e. invalidate cached translations of selected pages; 4) indicates to the ILP that action is complete; and 5) transitions from OS-level to user-level. Unfortunately, the overall latency of this sequence has a negative impact on the performance of user applications running on the RLP.

In addition to the latency impact, in several scenarios, the RLP cannot immediately service the IPI, so handling of the ILP's request is delayed. In these scenarios, the ILP waits for acknowledgment and completion of the request and this has a negative impact on the performance of applications running on the ILP.

Discussed herein, an RLP handles a RAR using Remote Action Request Handler (RARH) hardware which interrupts a normal execution flow of operations in the processor, but does not present the handling to software. After detecting the request, the RARH on the RLP reads the payload from memory and performs the requested action without software involvement. After completing the action, the RLP notifies the ILP of its success/failure. This notification may be done by writing to a location in memory, or by sending a new dedicated signal to a counter in the ILP that collects acknowledgements from all RLPs.

Embodiments of an Exemplary Computer System Supporting Remote Action Request Handling FIG. 1 illustrates an embodiment of a computer system. In this embodiment, a plurality of logical processors (processor 0 101 and processor N 111) are shown. Each logical processor is associated with at least one hardware execution (functional) unit to execute instructions as a part of an execution pipeline. The logical processors AAA01 and 111 may communicate with each other via a shared memory 121 (such as system memory, a shared cache, etc.) or via interfaces using one or more buses/interconnects 131. Shared memory 121 stores a data structure of actions to be performed 123 and an action payload data structure 125 (embodiments of which are shown in FIGS. 3 and 2).

Interrupt controllers 102 and 112 prioritize, decode, and vector exceptions and interrupts. Exemplary interrupt controllers include, but are not limited to, Advanced Programmable Interrupt Controllers (APICs), Generic Interrupt Controllers (GICs), MultiProcessor Interrupt Controllers (MPICs). Interrupt controllers 102 and 112 may be input/output (I/O) or local interrupt controllers.

These interrupt controllers 102 and 112 provide interprocessor interrupts (IPIs) which allow other processors to interrupt another processor or set of processors. In some embodiments, an IPI is generated by a processor writing to a register (such as an interrupt command register or software interrupt register) associated with its interrupt controller. This register stores an interrupt vector and an identification of the target processor (in some embodiments, an interrupt controller ID is used). A message is then sent via an interrupt bus to the target interrupt controller which then issues the interrupt to its processor for handling (for example, invoking an interrupt handler).

A TLB 109 and 119 per processor 101 and 111 caches virtual to physical page translations as detailed above. In some embodiments, these TLBs 109 and 119 are separate physical circuits. In other embodiments, a single physical TLB circuit is logically partitioned amongst the processors.

A plurality of registers 108 and 118 (in addition to typical general purpose registers, floating point registers, status registers, etc.) per processor are used to support RARH. One register that may be used is an interrupt command register or software interrupt register as detailed above. Depending upon the implementation, the plurality of registers 108 and 118 also include: i) a register to store a specific IPI vector that denotes hardware-based action handling called a Remote Action Request Interrupt (RARI); ii) a register to store a memory location of a payload(s) which contain(s) request information for possible concurrent requests; and/or iii) a register to store a memory location of a list of action requests for RLPs. In some embodiments, the memory location holds a table of action requests. Examples of payloads include, but are not limited to, a request to: i) invalidate an entire (remote) TLB (instead of a single entry of the TLB); 2) invalidate a single (remote) entry of a TLB; 3) invalidate N consecutive pages of a (remote) TLB; and/or 4) perform no action.

The registers 108 and 118 may also include storage for a few characteristics of the RAR feature such as: interrupt vector, Payload and Action Memory Resident Table Sizes, Max Payload Type, etc.

A request to perform no action draws the attention of the RLP and an acknowledgment to the ILP. In some processors, when an RLP receives an IPI message all intermediate data structures that hold data not presented to external memory are flushed, but to do so requires changing the ring, etc. as detailed above. A perform no action as detailed herein flushes these data structures, but does not cause a ring change just like the other requests.

Remote action handlers 103 and 113 are circuitry which identify a RARI, perform the requested action of the RARI, and signal acknowledgment to the ILP. Performance of the action may be done by calling one or more hardware handlers. Software is not involved in the handling of the RAR by the remote action handlers 103 and 113. Remote action handers 103 and 113 may also perform actions with respect to polling an action data structure and clearing a payload from a payload data structure.

Remote action interfaces 105 and 115 are circuitry which receive a signal related to RAR that does not use IPI signaling and read the payload of the signal, perform the requested action, and acknowledge the request. For example, an RAR instruction executed on an ILP causes a signal to be received by the remote action interface of the RLP that handles the RAR. Performance of the action may be done by calling one or more hardware handlers. Software is not involved in the handling of the RAR by the remote action interfaces 105 and 115. Remote action interfaces 105 and 115 may also perform actions with respect to clearing a payload from a payload data structure. Note that a processor need not support both remote action handlers 103 and 113 and remote action interfaces 105 and 115.

The execution of the RAR instruction on the ILP causes its remote action counter 107 and 117 to be set with a number of RLPs which are to acknowledge the RAR. These counters 107 and 117 are circuitry which counts a number of acknowledgments. A completion of a RAR is signaled through these counters 107 and 117. For example, in some embodiments, when all acknowledgments are received, the counters 107 and counters detect this and signal that the operation is done. In some embodiments, software may check the status of a remote action counter by executing a remote action request completion instruction (RARC) to read the counter value.

FIG. 2 illustrates an embodiment of a payload data structure. In this example, the data structure is a table, however, other data structures such as dedicated registers may be used. In the illustrated table, there is a column to indicate if a payload is valid 201 (not complete) and a column for the payload itself (or a pointer to the payload) 203 per action. The payload may include a request and an address associated with the request. In the illustration, the payload of the first row includes an invalidate page request and an address of the page to invalidate in the TLB. The payload data structure is typically initially programmed by the ILP, read by an RLP, and cleared by the ILP. In some embodiments, each entry in the data structure corresponds to an action.

FIG. 3 illustrates an embodiment of an actions data structure. In this example, the data structure is a table, however, other data structures such as dedicated registers may be used. In the illustrated table, there is a column per action 301 and each row corresponds to an RLP. Entries 303 in the table indicate a status of a particular action with respect to the RLP. Exemplary statuses include pending, success, or failure. Of course, any data structure variant containing similar information may be used. This actions data structure is typically initially programmed by the ILP, read by an RLP, cleared by the RLP, and then read by the ILP.

Figure 4:
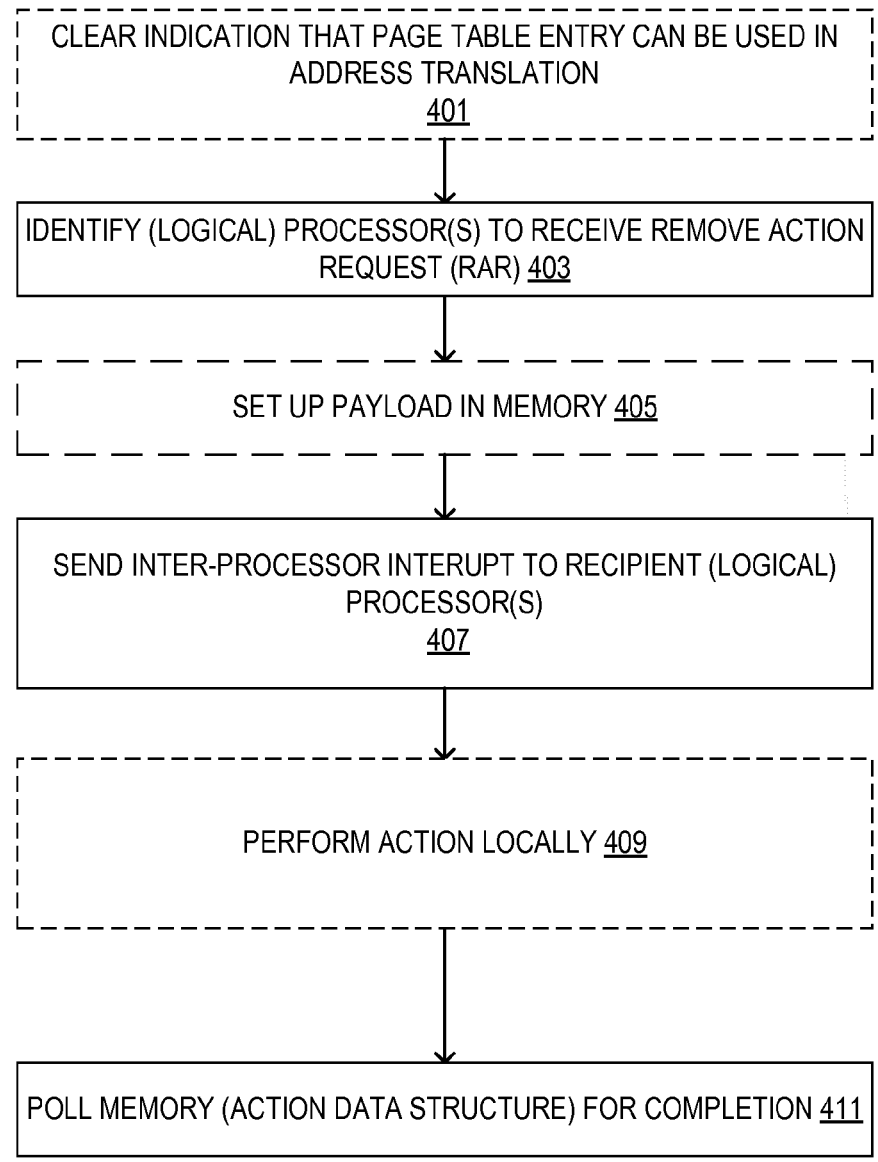
FIG. 4 illustrates an embodiment of a method performed by an ILP to initiate a RAR.

Embodiments of an Exemplary Computer System Supporting Remote Action Request Handling FIG. 4 illustrates an embodiment of a method performed by an ILP to initiate a RAR. Typically, this is performed by a combination of a core, remote action handler, interrupt controller, and TLB of the ILP.

In some embodiments, at 401, an indication that a page table entry can be used in address translation is cleared by the ILP. For example, a present bit in the page table entry is cleared.

At 403, one or more processors are identified as RLPs to receive a RAR.

The ILP configures a payload in memory at 405. For example, an instruction to invalidate a page and an address of that page are stored in a payload data structure 123 in memory 121.

An IPI is sent to the identified RLPs at 407. In some embodiments, the ILP writes to an interrupt command register or software interrupt register that a RAR has been made which triggers an interrupt to the RLP(s). This writing includes an identification (such as an APIC ID) of the RLPs to process the RAR.

In some embodiments, a corresponding action is performed locally in the ILP at 409. For example, the ILP invalidates a page in its own TLB.

At 411, the ILP polls an action data structure in memory to determine if all of the RLPs have completed and acknowledged the action. This may be repeated after a set amount of time and if the action data structure does not change for a threshold amount of time (cycles), then the ILP triggers software to do further processing.

Figure 5:
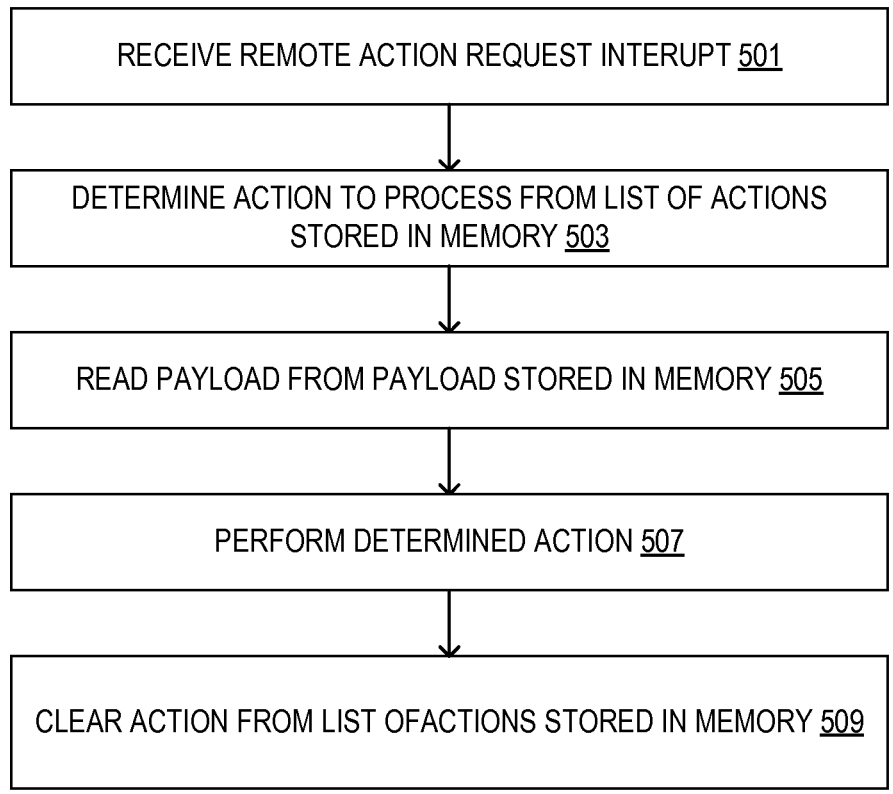
FIG. 5 illustrates an embodiment of a method performed by an RLP to process a RAR.

FIG. 5 illustrates an embodiment of a method performed by an RLP to process a RAR. In 501, the RLP receives a RAR interrupt from an ILP. The RLP receives this interrupt via its remote action interface which has been detailed above. In some embodiments, the ILP writes to an interrupt command register or software interrupt register that an RAR has been made which triggers an interrupt to the RLP(s). This writing includes an identification (such as an APIC ID) of the RLP(s) to process the RAR.

In 503, the RLP (in particular, the remote action handler of the RLP) determines the action to be performed by reading from a list of actions stored in memory. For example, the RLP reads an action from actions data structure 123.

In 505, the RLP (in particular, the remote action handler of the RLP) reads a payload from memory associated with the action. For example, the RLP reads a payload from payload data structure 125. For example, an RLP may read for a valid payload, a TLB invalidation request and its associated address.

In 507, the RLP (in particular, the remote action handler of the RLP) performs the determined action. In some embodiments, the remote action handler includes circuitry to perform the action itself. In other embodiments, the remote action handler calls a particular handler to perform the action.

In 509, the RLP (in particular, the remote action handler of the RLP) clears the action from the actions data structure store in memory. For example, the RLP clears an action from actions data structure 123.

Embodiments of an Exemplary Computer System Supporting Remote Action Request Handling As part of page table management, operating systems (OSes) need to ensure that any page table entry that needs to be modified is not cached in any translation lookaside buffer (TLB) in any of the logical processors (LPs) in the system. When an OS running on one logical processor detects that it needs to make a modification to the page tables, it initiates a remote TLB-shoot-down protocol to flush the cached translations from the TLBs of all of the system's logical processors. The initiating logical processor (ILP) sends the shoot-down request to recipient logical processors (RLPs). At a high level, what an ILP is requesting is for remote action handling (RAH) by the RLP. Some architectures do not allow for flushing of multiple consecutive pages from the TLB without flushing the entire TLB. Each page invalidation requires the invocation of an additional instance of an invalidate page (INVLPG) instruction. This can lead to a performance impact if a large number of consecutive pages, but not the entire TLB, needs to be invalidated.

Figure 6:
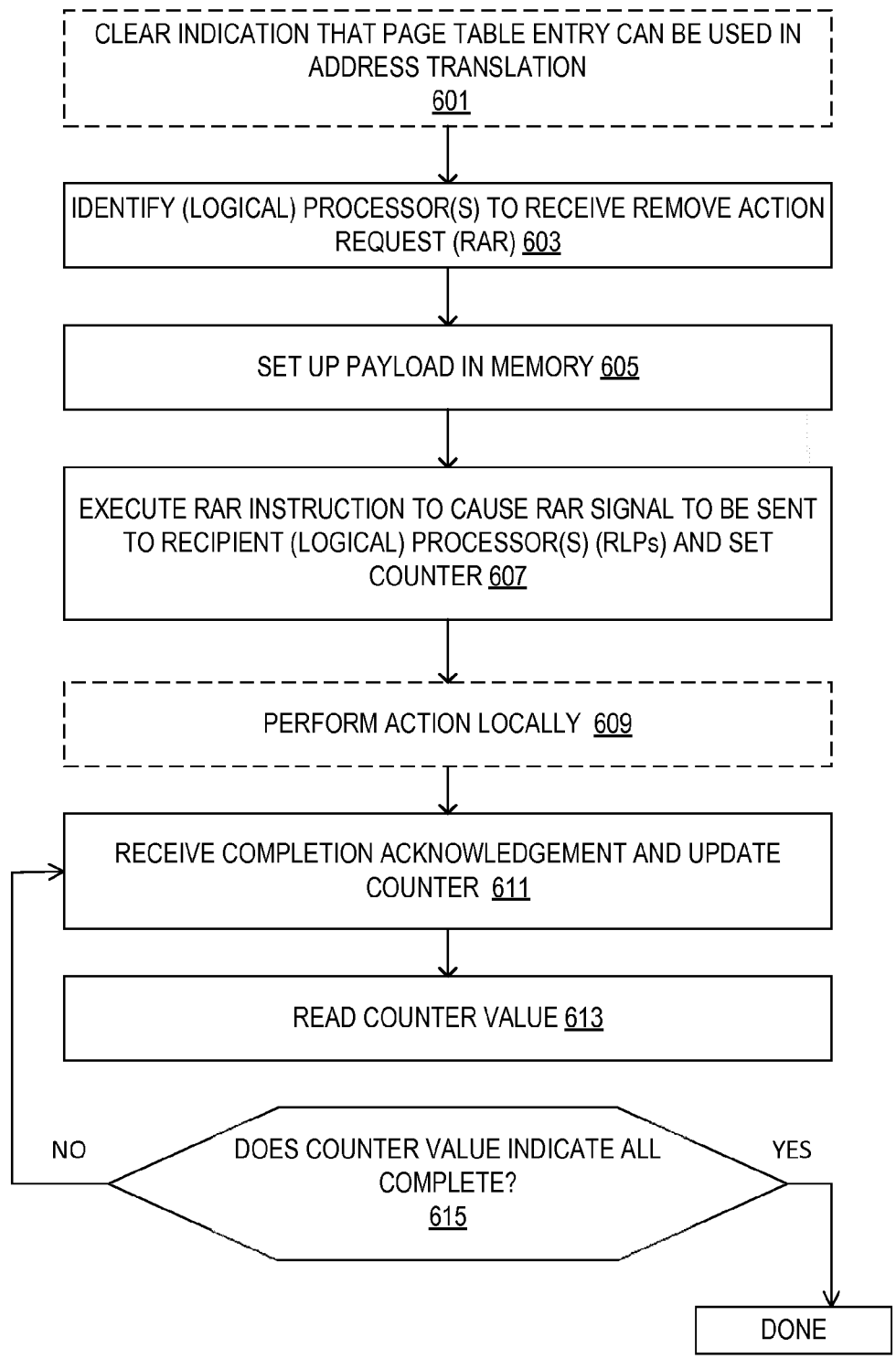
FIG. 6 illustrates an embodiment of a method performed by an ILP to initiate a RAR.

FIG. 6 illustrates an embodiment of a method performed by an ILP to initiate a RAR. Typically, this is performed by a combination of a core, remote action interface, interrupt controller, and TLB of the ILP.

In some embodiments, at 601, an indication that a page table entry can be used in address translation is cleared by the ILP. For example, a present bit in the page table entry is cleared.

At 603, one or more processors are identified as RLPs to receive a RAR.

The ILP configures a payload in memory at 605. For example, an instruction to invalidate a page and an address of that page are stored in a payload data structure 123 in memory 121.

A RAR instruction is executed by the ILP to cause a RAR signal to be sent to the identified RLPs and to set a counter value to be a number corresponding to the number of identified RLPs at 607. For example, a RAR signal is sent by a remote action interface 105 via a bus or interconnect 131 to each of the identified RLPs and counter 107 is set to a number of RLPs that are to handle the request.

In some embodiments, a corresponding action is performed locally in the ILP at 609. For example, the ILP invalidates a page in its own TLB.

At 611, a completion acknowledgment is received from a RLP and the counter is updated (decremented) to reflect completion. For example, an RLP has performed the requested action and has sent an acknowledgment over the bus or interconnect 131 to the remote action interface 105 and/or remote action counter 107.

A value of the remote action counter 107 is read at 613.

A determination of if the read value indicates that all RLPs have completed the request is made at 615. For example, is the counter zero?

When the counter indicates that all RLPs have completed and the request has been handled by all RLPs, then the method is complete. If not, then the counter is read again after another acknowledgment is received. If the counter does not change for a set threshold amount of time (cycles), then the ILP triggers software to do further processing.

Figure 7:
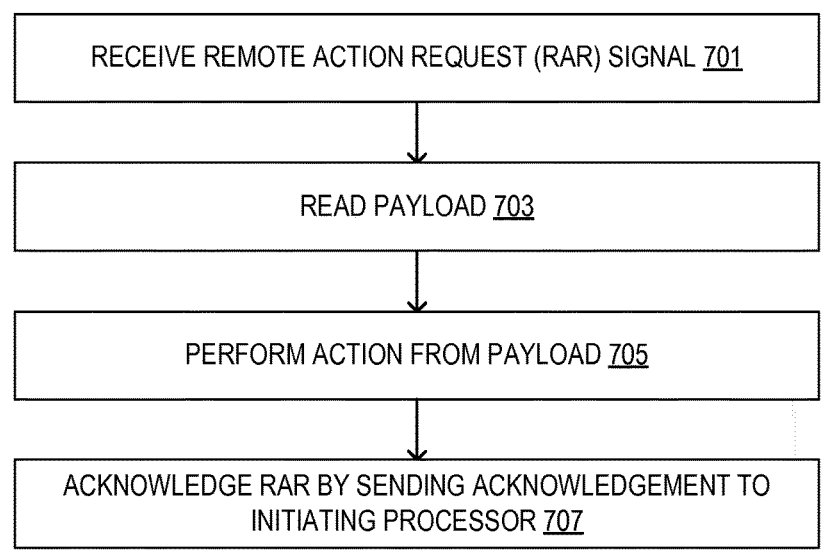
FIG. 7 illustrates an embodiment of a method performed by an RLP to process a RAR.

FIG. 7 illustrates an embodiment of a method performed by an RLP to process a RAR. In 701, the RLP receives a RAR from an ILP. The RLP receives this request via its remote action interface which has been detailed above. In some embodiments, the ILP executes an instruction to cause a signal to be sent to the RLP(s) regarding the RAR. The ILP will also store a payload associated with the RAR into a payload data structure.

In 703, the RLP (in particular, the remote action interface of the RLP) reads a payload from memory. For example, the RLP reads a payload from payload data structure 125. For example, an RLP may read for a valid payload, a TLB invalidation request and its associated address.

In 705, the RLP (in particular, the remote action handler of the RLP) performs the determined action. In some embodiments, the remote action handler includes circuitry to perform the action itself. In other embodiments, the remote action handler calls a particular handler to perform the action.

In 707, the RLP (in particular, the remote action handler of the RLP) acknowledges the RAR by sending an acknowledgment to the ILP. For example, the RLP sends an acknowledgment to the ILP which then decrements its counter.

An Exemplary Remote Action Request Handling

Figure 8:
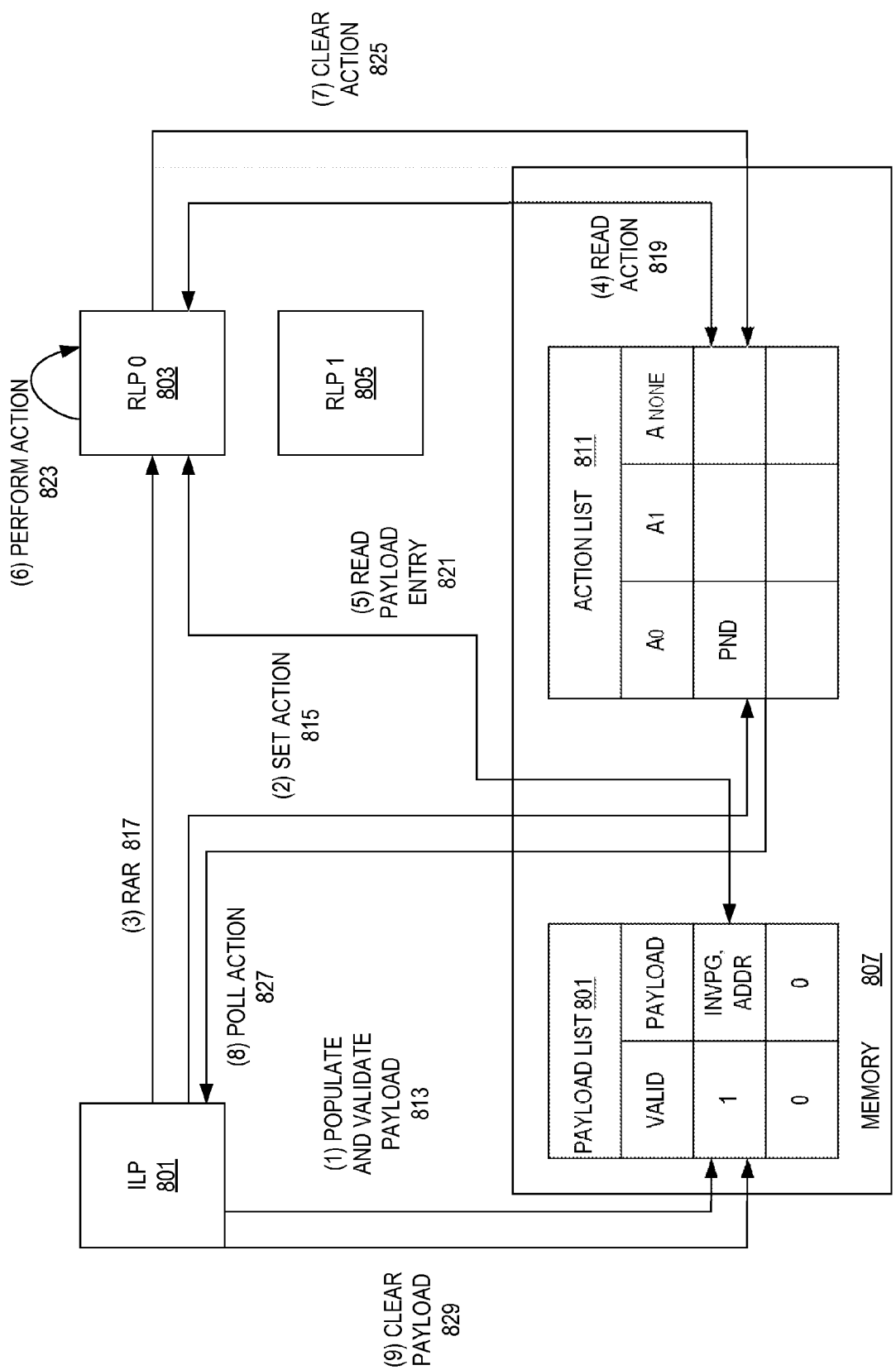
FIG. 8 illustrates an embodiment of block diagram of a RAR flow using a payload and action data structure stored in memory.

FIG. 8 illustrates an embodiment of block diagram of a RAR flow using a payload 809 and action data structure 811 stored in memory. Shown in the embodiment is an ILP 801 which makes the RAR to one of a plurality of RLPs 803 and 805.

The ILP 801 populates and validates a payload at 813. In this illustration, the valid bit of an entry in the payload data structure 809 in memory is set to 1 and the payload is set to INVLPG, Addr (invalidate a page at the address).

The ILP 801 sets an action in the action data structure of memory for the RLPs to process the request at 815. In this example, action $A_0$ set as pending (PND) for RLP0.

A RAR interrupt is set from the ILP 801 to RLP 0 803 at 817. As noted above, this is typically done by writing to a specialized register in the ILP 801 which triggers an IPI to the RLP.

RLP 0 803 reads its associated actions from the action data structure 811 at 825. In this example, the first row is associated with RLP 0 804.

RLP 0 803 reads a payload in the payload data structure 809 that corresponds to the read action at 821. In this example, action $A_0$ corresponds to the first entry of the payload data structure 809.

RLP 0 803 performs the action associated with the read payload at 823. In this example, RLP 0 803 invalidates a page at the designated address.

After the action is performed, RLP 0 803 clears the action from the action data structure 811 at 825.

At some point after making the RAR, ILP 801 polls the action data structure 811 to see if its set action has been performed at 827. If so, then the payload for that action is cleared at 829. If not, ILP 801 will either call on software to handle the request or re-poll the action data structure 811.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
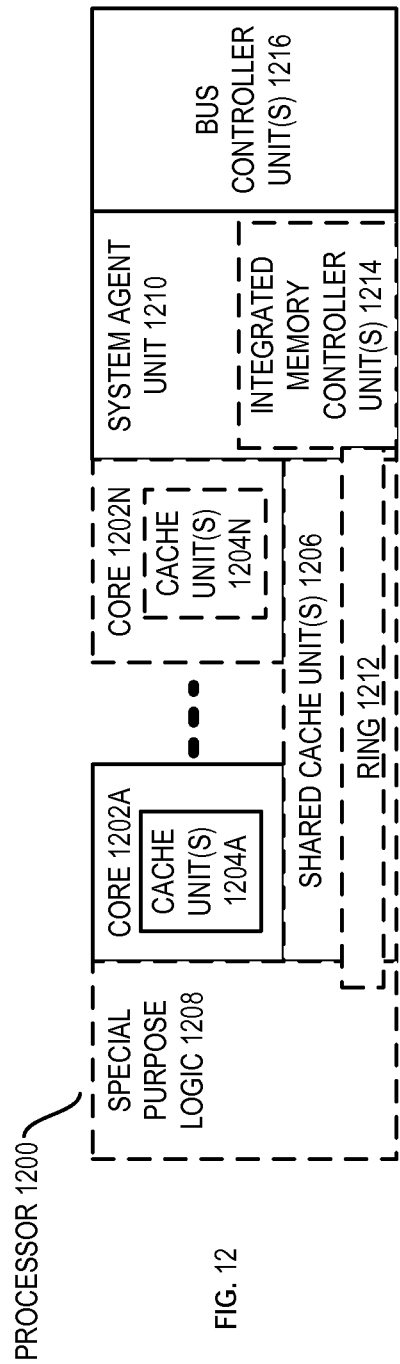
FIG. 12 is a block diagram of a processor 1200 that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
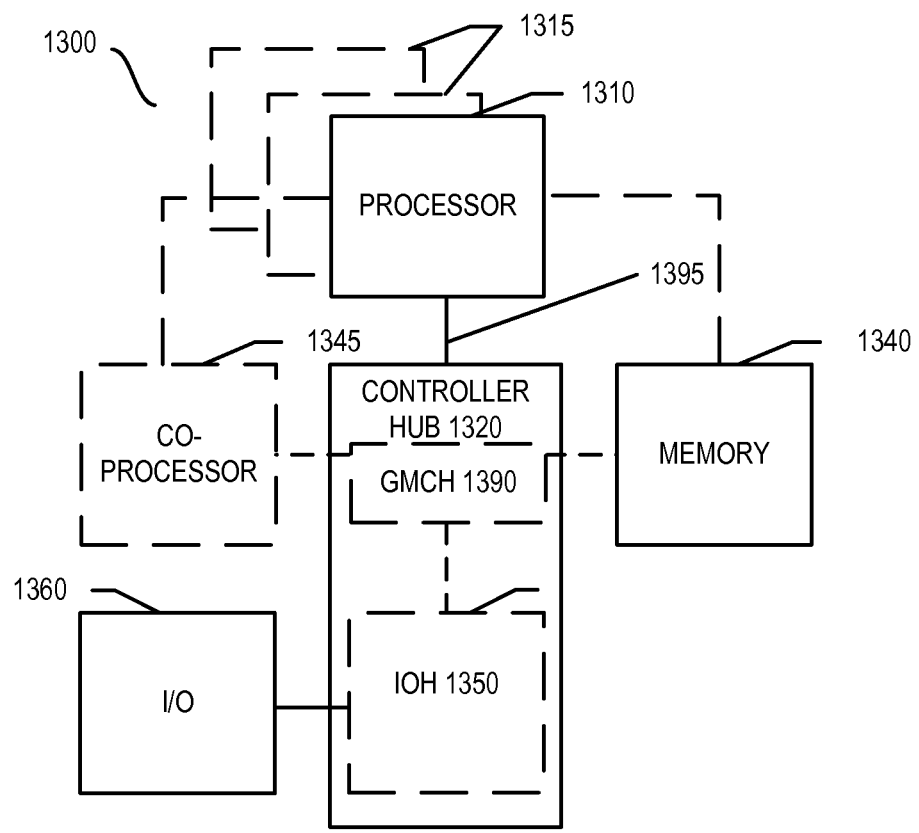
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
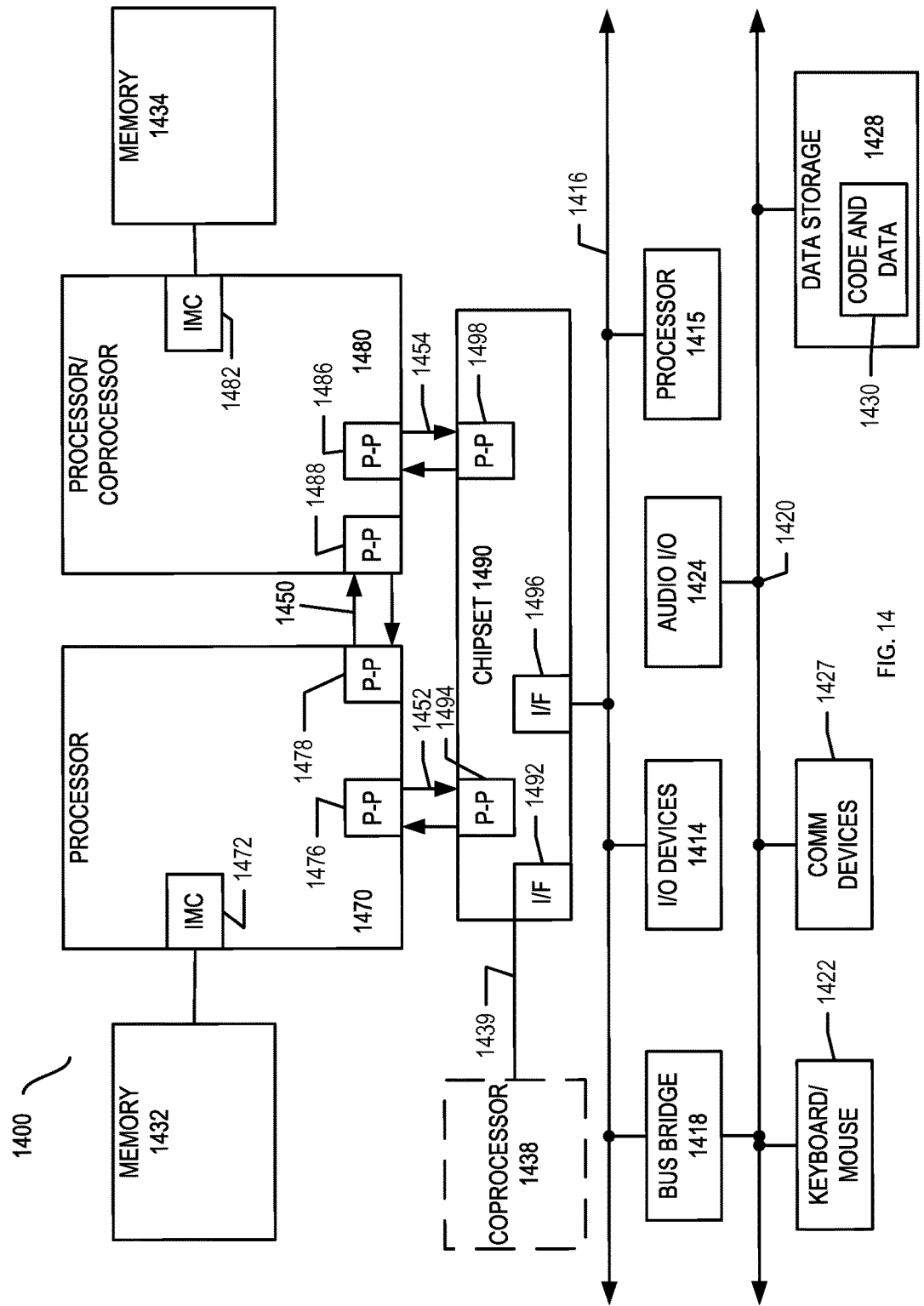

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
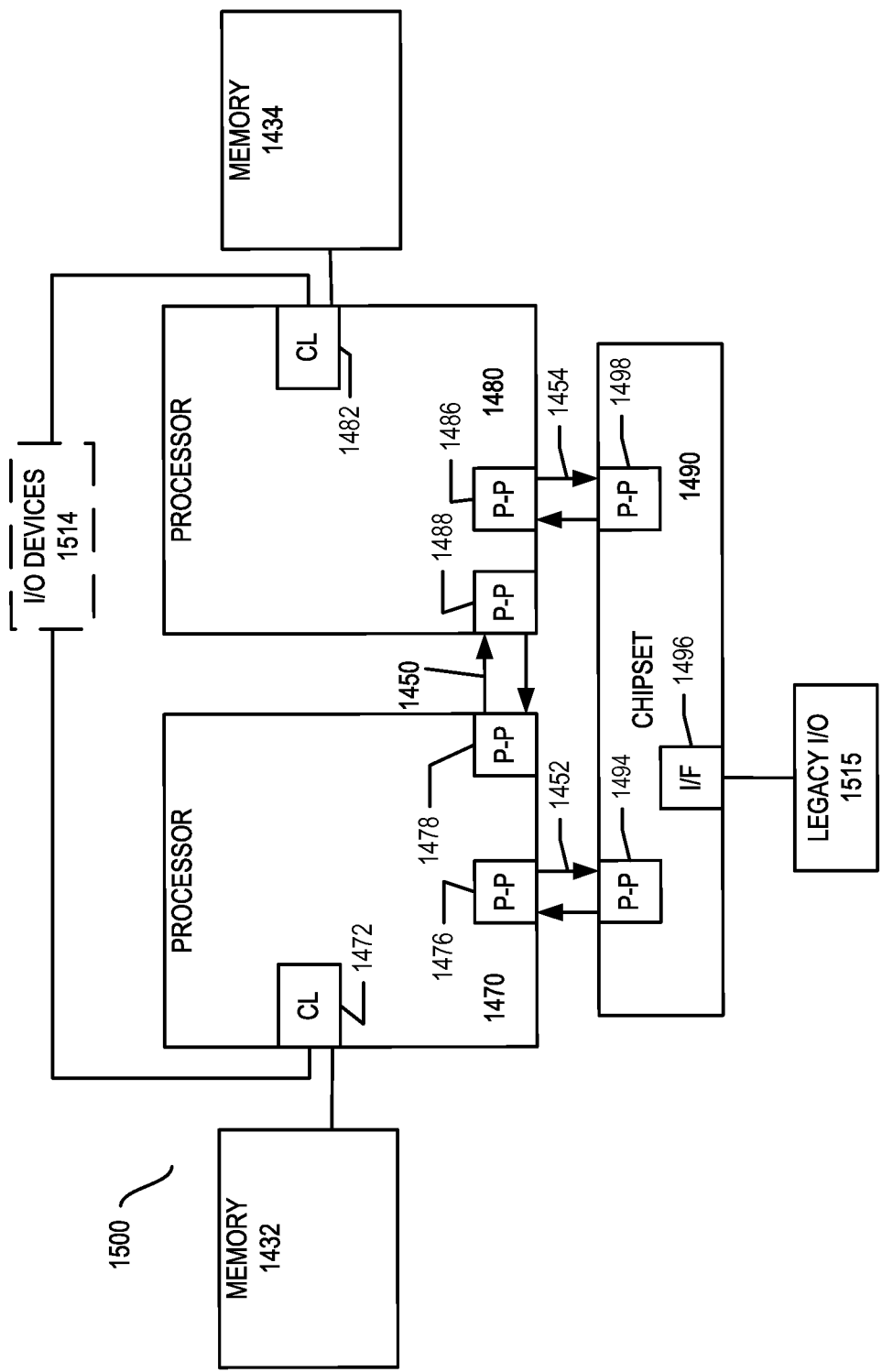

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
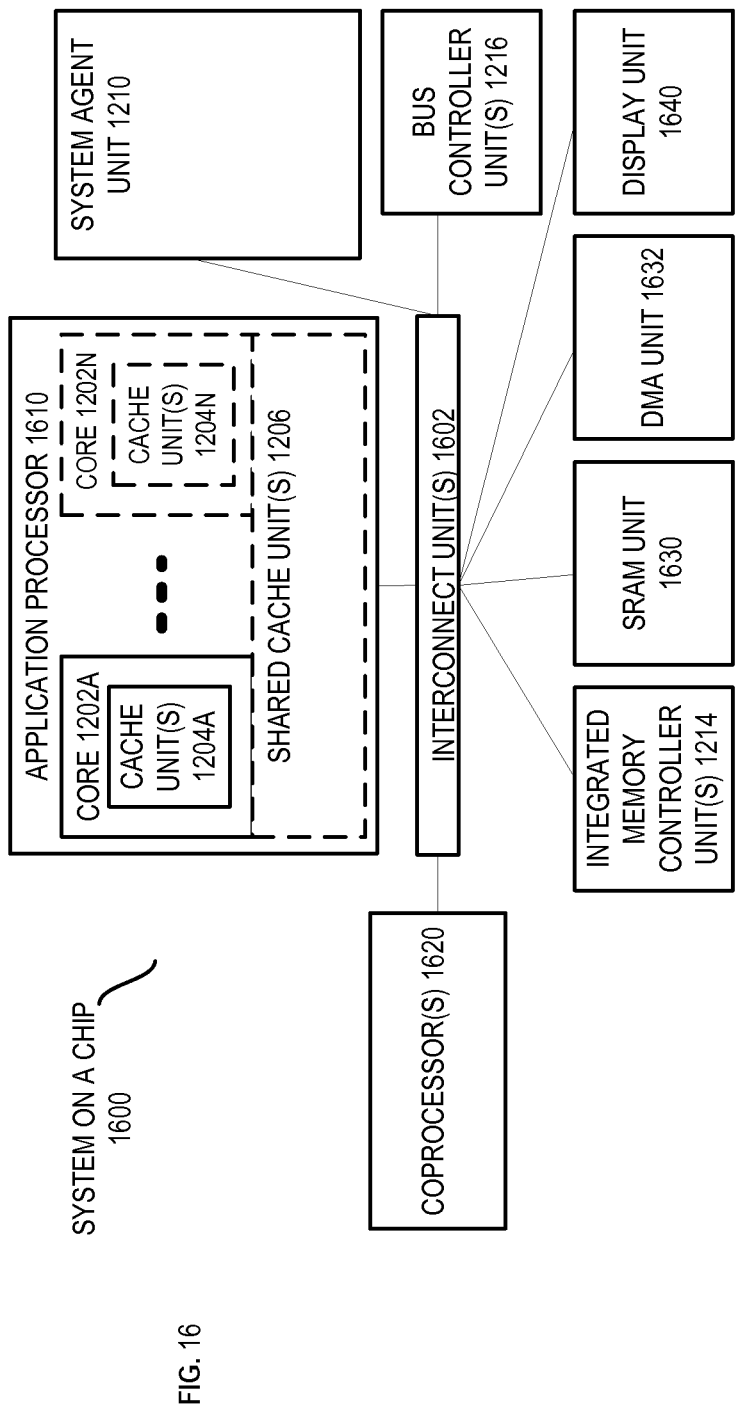
Figure 17:
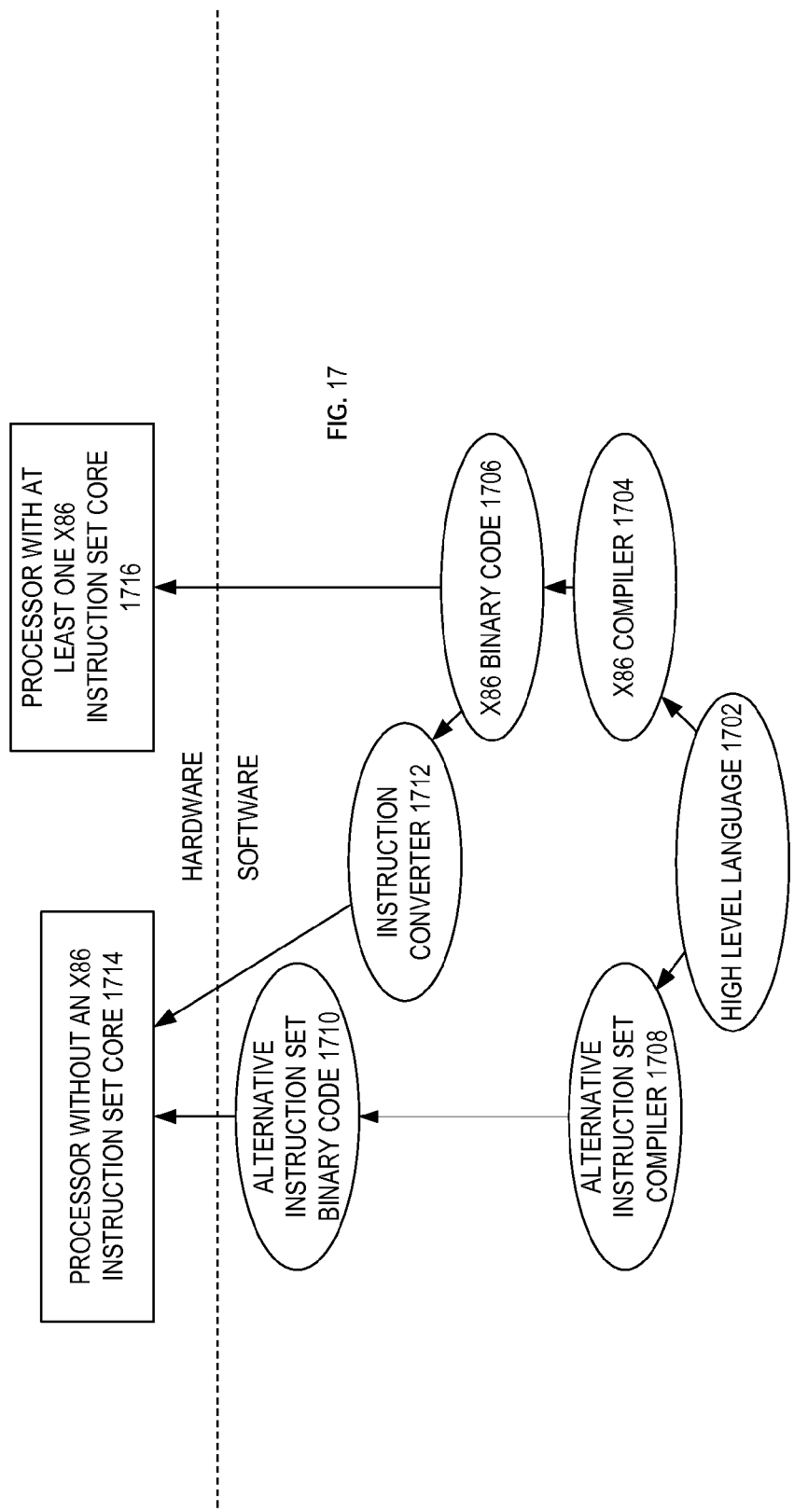
FIG. 17 is a block diagram contrasting the use of a software instruction converter to convert binary instructions in a source instruction set to binary instructions in a target instruction set according to embodiments of the invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

We claim:

1. A hardware apparatus comprising:
a first register in a processor core to store a memory address of a payload corresponding to an action to be performed associated with a remote action request (RAR) interrupt;
a second register in a processor core to store a memory address of an action list accessible by a plurality of processors;
a remote action handler circuit to:
identify a received RAR interrupt,
access the action list to identify an action to be performed and access the payload associated with the identified action,
perform the action of the received RAR interrupt, and
signal acknowledgment to an initiating processor upon completion of the action.

2. The hardware apparatus of claim 1, further comprising:
a translation lookaside buffer (TLB) of virtual to physical page translations.

3. The hardware apparatus of claim 2, wherein the action is to be one of:
invalidate the entire TLB;
invalidate a single entry of the TLB;
invalidate a number of consecutive pages of the TLB; and
perform no action.

4. The hardware apparatus of claim 1, further comprising:
a memory to store the payload and the action list.

5. The hardware apparatus of claim 1, wherein the remote action handler circuit to signal acknowledgment by clearing the action associated with the RAR interrupt from the action list.

6. The hardware apparatus of claim 1, wherein the remote action handler to call a dedicated hardware handler to perform the action.

7. The hardware apparatus of claim 1, wherein the memory is further to store an indication of validity of the payload.

8. A method comprising:
identifying a received remote action request (RAR) interrupt;
accessing an action list to identify, an action to be performed, the action list accessible by a plurality of processors and an address of the action list stored in a first register of a processor of the plurality of processors;
accessing a payload list that is stored in a second register of the processor of the plurality of processor associated with the identified action;

performing the action of the received RAR interrupt; and signaling acknowledgment to an initiating processor upon completion of the action.

9. The method of claim 8, wherein the action to be one of:

invalidate an entire translation lookaside buffer (TLB);

invalidate a single entry of the TLB;

invalidate a number of consecutive pages of the TLB; and perform no action.

10. The method of claim 8, wherein the signaling of acknowledgment is by clearing the action associated with the RAR interrupt from the action list.

* * * * *